United States Patent [19]
McGushion et al.

[11] Patent Number: 5,103,853
[45] Date of Patent: Apr. 14, 1992

[54] SAFETY SHUT OFF VALVE FOR GAS CYLINDERS

[76] Inventors: Kevin D. McGushion, 2450 Oak St., #E, Santa Monica, Calif. 90405; John H. Otteman, 4005 Hecker Pass Hwy., Gilroy, Calif. 95020

[21] Appl. No.: 669,427

[22] Filed: Mar. 15, 1991

[51] Int. Cl.⁵ .................................. F16K 17/40
[52] U.S. Cl. ............................ 137/71; 137/68.1
[58] Field of Search ........................ 137/68.1, 71

[56] References Cited
U.S. PATENT DOCUMENTS

| | | | |
|---|---|---|---|
| 1,223,899 | 4/1917 | Parks | 137/71 |
| 1,698,616 | 1/1929 | Woodham | 137/71 X |
| 2,563,244 | 8/1951 | Holicer | 137/71 X |
| 2,945,503 | 7/1960 | Atkinson | 137/68.1 |
| 3,618,626 | 11/1971 | Russo | 137/68.1 |
| 3,645,286 | 2/1972 | Follett | 137/68.1 |
| 3,648,893 | 3/1972 | Whiting | 137/68.1 X |
| 3,776,250 | 12/1973 | Knox | 137/71 |
| 3,794,057 | 2/1974 | Badger | 137/68.1 |
| 3,930,517 | 1/1976 | Gagala | 137/71 X |
| 3,995,694 | 12/1976 | Freiburger | 137/71 X |
| 4,056,117 | 11/1977 | Deeks | 137/68.1 |
| 4,077,422 | 3/1978 | Brinkley et al. | 137/68.1 |
| 4,562,852 | 1/1986 | Britt | 137/68.1 |
| 4,907,617 | 3/1990 | Whalen | 137/68.1 X |

*Primary Examiner*—John Rivell
*Attorney, Agent, or Firm*—Donald D. Mon

[57] ABSTRACT

A safety valve for attachment to a gas cylinder. It has a body rigidly attachable to the port of a gas cylinder, with an inlet and an outlet. A valve between the inlet and outlet is held open by a fragile stem that is maintained in tension. When sufficient bending forces are exerted on the safety valve the stem breaks, its parts move apart from one another, and the safety valve closes.

3 Claims, 2 Drawing Sheets

SAFETY SHUT OFF VALVE FOR GAS CYLINDERS

FIELD OF THE INVENTION

This invention relates to a safety valve fitted to a gas cylinder which shuts off its own flow passage when this valve itself is damaged.

BACKGROUND OF THE INVENTION

Cylinders for gas under pressure are conventionally cylindrical in shape, with an upper shoulder through which a port passes. Valving and regulating devices are attached to threads at this port, and extend beyond the cylinder itself where they are exposed to the risk of physical damage by impact. In transit, caps are screwed onto the shoulder to protect anything attached to the port, and are generally satisfactory.

However, when the caps are removed, and sometimes even when they are in place, impact forces may be exerted, perhaps from dropping the cylinder, which could damage the valves and permit the confined gases to escape. The situation is bad enough when non-toxic gases are involved, although in these situations there still exists the potential problem of jet-like movement of the cylinder due to impulse of the escaping gases. But when toxic gases are involved, such as arsine or other gases used in the semi-conductor industry, escape of the gases can lead to catastrophic consequences.

It is an object of this invention to provide a safety shutoff valve which is normally open, but when it is distorted, immediately closes the port from the gas cylinder. Thus, whatever may have happened to it or to any downstream controls directly attached to it, the gas cylinder will be shut off from leakage.

BRIEF DESCRIPTION OF THE INVENTION

A safety shut-off valve according to this invention includes a body adapted to be attached to the shoulder of a gas cylinder, and to extend for a substantial distance beyond it. The body has a flow passage with an inlet located in the gas cylinder, and an outlet located outside of it.

A valving chamber is formed in the flow passage between the inlet and the outlet, and a valve seat is disposed around the passage facing into the valving chamber.

A plug is disposed in the valving chamber facing the valve seat. A stem is fixed to the plug and extends through the passage downstream from the plug. The stem is side-supported in the flow passage so it will be bent by bending forces which are sufficient to permanently distort the body. It has a substantial length.

The stem includes a frangible portion fixed to the other side of the plug and to the body. It includes a region of least resistance to bending movements, and will be the first part of the stem to break when sufficient bending forces occur.

A bias spring biases the plug toward its closed position, while the frangible portion holds it in its open position.

When sufficient bending forces are exerted, the frangible portion parts and the bias spring moves the plug to its closed position without impediment from any part of the stem.

The above and other features of the invention will be fully understood from the following detailed description and the accompanying drawings, in which:

DETAILED DESCRIPTION OF THE INVENTION

Figure 2:
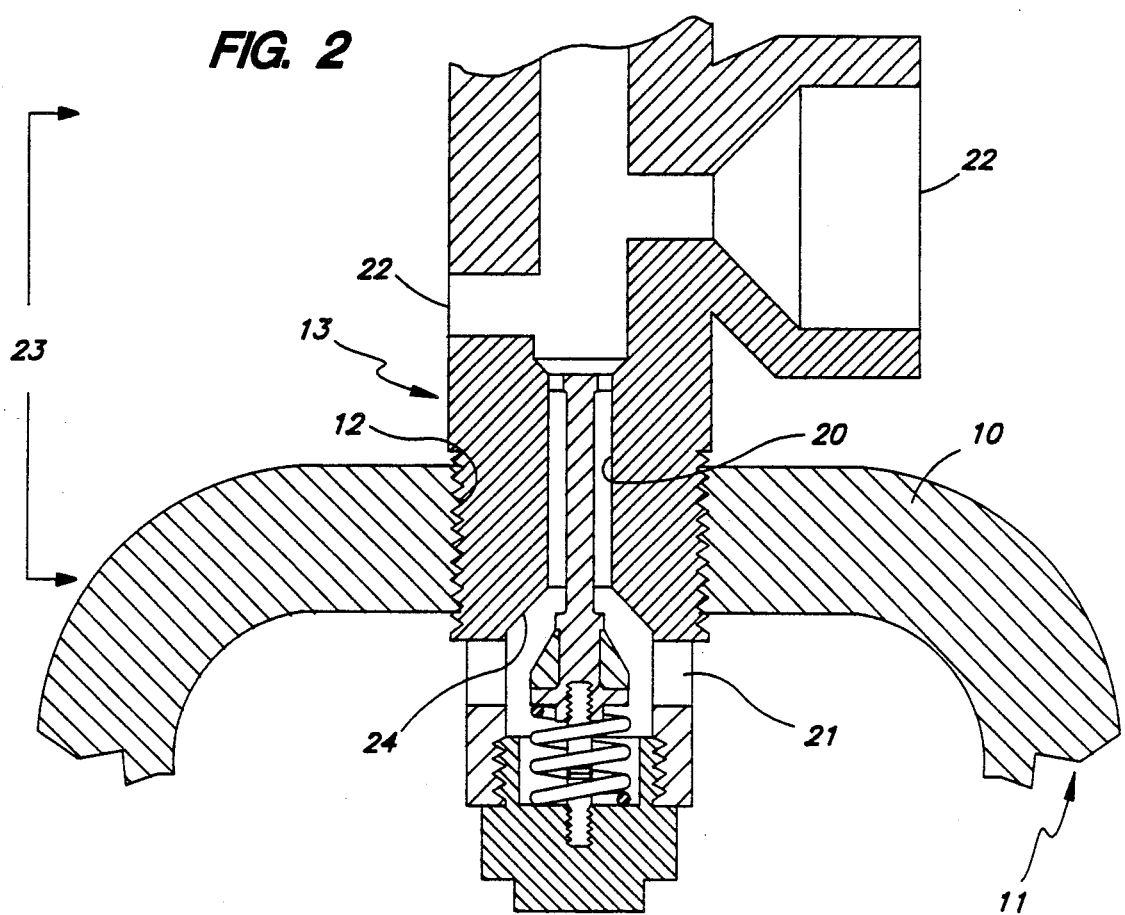
FIG. 2 is an axial cross-section showing the valve of FIG. 1 installed in a cylinder.

In FIG. 2, the shoulder 10 of a gas cylinder 11 is shown, with a port 12 into which a safety shut-off valve 13 according to this invention is fitted.

Valve 13 has a central axis 14, and includes a body 15 with threads 16 to fit the valve in the cylinder port, and a base 17. A substantial axial length of the body extends beyond the cylinder where it will be responsive to a mechanical bending forces.

A flow passage 20 extends from inlets 21 to outlets 22. Inlets 21 are inside of the cylinder. Outlets 22 are outside of the cylinder. There is a substantial cylindrical length 23 of the flow passage downstream from a valve seat 24.

Valve seat 24 surrounds the flow passage at its exit from valving chamber 25. Valving chamber 25 may be considered to be part of the flow passage because it receives gas from the inlet and passes them toward the outlet when the valve is open to flow.

A valve 30 includes seat 24 and a plug 31. The seat and the plug are tapered to make a tight fluid seal when the valve is closed. The valve also includes a stem 32 fixed to the plug, portion 33 of which extends through the cylindrical portion of the flow passage. It is slidingly side-supported for axial movement by a spider 85 and is responsive to bending of the body.

The stem also includes a frangible portion 86. Portion 86 is fixed to the other side of the plug from portion 88. Conveniently it may be threaded at both ends so as to be threaded into the plug and also threaded into a socket 37 in the body. Frangible portion 86 has a peripheral groove 88 or notch that is the place of weakest resistance to bending forces. If the body is sufficiently distorted, the stem will break there.

A bias spring 40 is opposed in compression between a shoulder 41 on the plug, and the body so as to place the frangible portion in tension. The bias spring is loaded so that when the frangible portion breaks at the groove, the spring will move the plug to close the valve.

When the valve is assembled, the stem will be turned to fix the frangible portion to the body and compress the spring. The safety valve is then ready for use.

Figure 1:
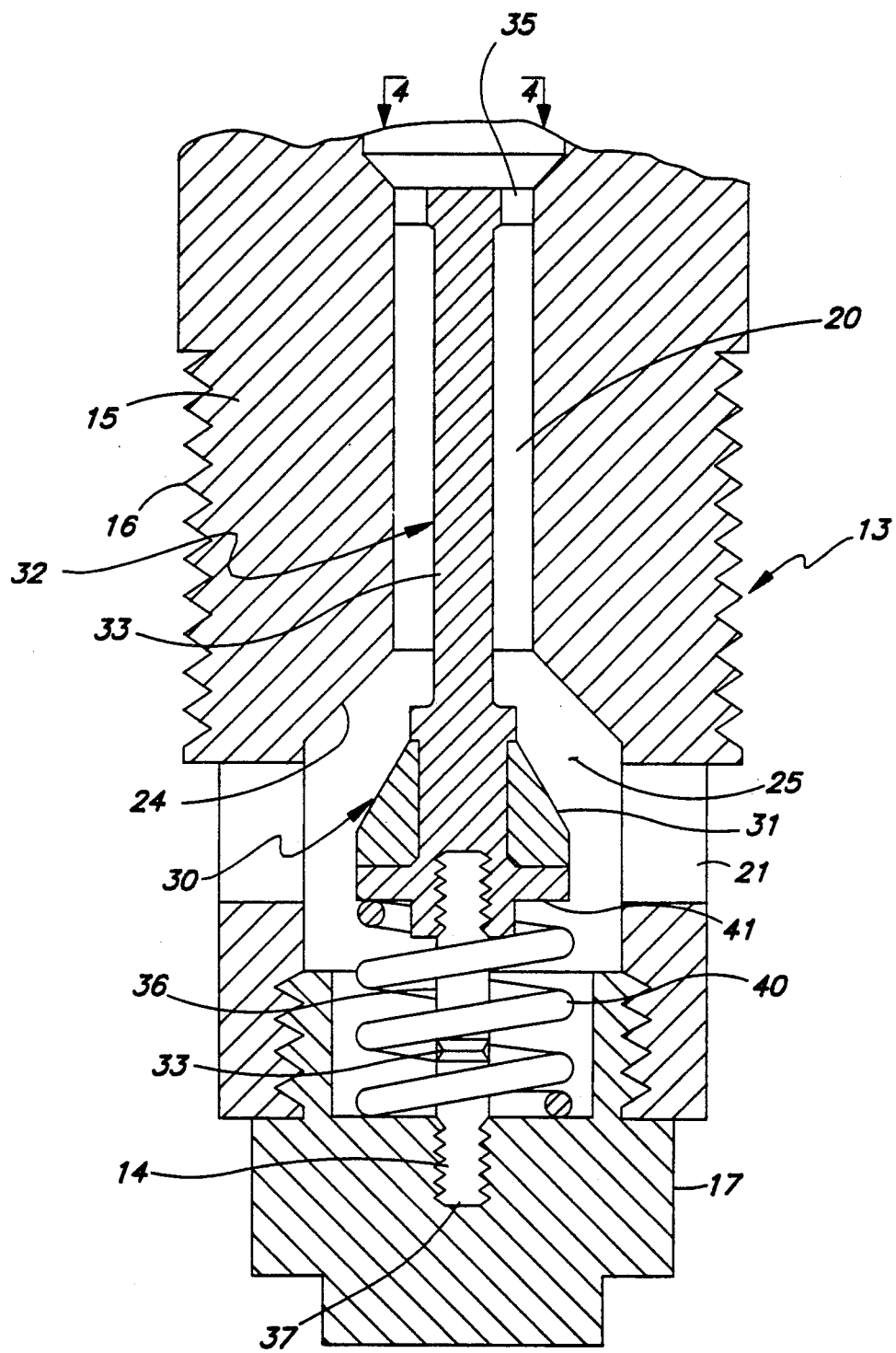
FIG. 1 is an axial cross-section of the presently preferred embodiment of the invention.
Figure 4:
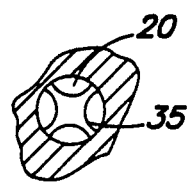
FIG. 4 is a cross-section taken at line 4—4 in FIG. 1.
Figure 3:
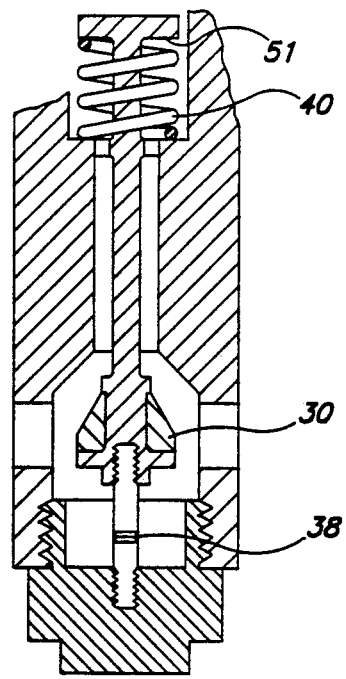
FIG. 3 is an axial cross-section of another embodiment of the invention.

Safety valve 50 as shown in FIG. 3, is identical to that of FIG. 1, except as to the location of its bias spring and a modification of the stem. Therefore like numerals will be used, and common details will not be repeated.

In this embodiment, the bias spring is not disposed in the valving chamber. Instead it is placed at the downstream end of of the cylindrical portion of the flow passage. The stem is modified by addition of shoulder 51 so the bias spring places the entire stem in tension instead of only the frangible portion. Apart from this, the construction and operation of the two embodiments are identical.

When a bending force is exerted that is sufficient to permanently distort the body and represent a risk of leakage, the spider will have exerted a moment on the stem tending to bend it. The stem is anchored in the body, so this bending is not accommodated, and the frangible portion will break at the groove, releasing the plug to close the valve.

The stem may be made of a wide variety of stiff and brittle materials, but ceramics are presently preferred. They have sufficient tensible strength, but a suitably low resistance to fracture in bending, especially when notched or grooved as shown.

Particular attention is called to the fact that the frangible portion is maintained in tension, and that when it breaks, there is no impediment to the closing movements of the plug. A safety valve employing a frangible portion maintained under compression is known, but when it breaks, the two portions of the stem engage each other, and can cause an impediment which prevents the valve from closing. This invention avoids that risk.

This invention is not to be limited by the embodiments shown in the drawings and described in the description, which are given by way of example and not of limitation, but only in accordance with the scope of the appended claims.

We claim:

1. A safety valve adapted to be attached to a gas cylinder comprising:
    a body having a central axis rigidly attachable to a port of a gas cylinder with a substantial length projecting outside of said gas cylinder, said body having a flow passage with an inlet disposed inside of said cylinder and an outlet disposed outside of said cylinder, a valving chamber in said flow passage between said inlet and said outlet, a valve seat in said flow passage facing into said valving chamber;
    a plug in said valving chamber movable to bear against or to be moved away from said valve seat;
    a slideable stem fixed to said plug extending through said valve seat from one side of said plug into a portion of said body subject to bending, said stem being side-supported in said body to respond to bending;
    a frangible portion of said stem extending from the other side of said plug, attached to the body and to the plug, said frangible portion constituting the region of least resistance to fracture as the consequence of bending forces exerted on said stem; and
    a bias spring in compression between said stem and said body placing at least said frangible portion in tension, whereby with the stem intact, the plug is held off the valve seat, but when the frangible portion breaks, the bias spring drives the plug against the valve seat to close the safety valve.

2. A safety valve according to claim 1 in which said bias spring is disposed between a shoulder on the plug and the body.

3. A safety valve according to claim 1 in which said bias spring is disposed between a shoulder on the stem and the body.

* * * * *